(12) United States Patent
Wu et al.

(10) Patent No.: US 10,374,417 B2
(45) Date of Patent: Aug. 6, 2019

(54) ARC-FREE DC CIRCUIT BREAKER

(71) Applicant: XI'AN JIAOTONG UNIVERSITY, Xi'an, Shaanxi (CN)

(72) Inventors: Yi Wu, Xi'an (CN); Mingzhe Rong, Xi'an (CN); Yifei Wu, Xi'an (CN); Fei Yang, Xi'an (CN); Chunping Niu, Xi'an (CN)

(73) Assignee: XI'AN JIAOTONG UNIVERSITY, Xi'An, Shaanxi (CN)

( * ) Notice: Subject to any disclaimer, the term of this patent is extended or adjusted under 35 U.S.C. 154(b) by 284 days.

(21) Appl. No.: 15/493,635

(22) Filed: Apr. 21, 2017

(65) Prior Publication Data
US 2018/0138695 A1  May 17, 2018

(30) Foreign Application Priority Data
Nov. 11, 2016  (CN) .......................... 2016 1 09933291

(51) Int. Cl.
*H02H 9/02* (2006.01)
*H01H 9/54* (2006.01)
(Continued)

(52) U.S. Cl.
CPC ............ *H02H 9/026* (2013.01); *H01H 9/542* (2013.01); *H01H 9/548* (2013.01);
(Continued)

(58) Field of Classification Search
USPC ...................................................... 361/2–13
See application file for complete search history.

(56) References Cited

U.S. PATENT DOCUMENTS

| 2014/0218832 A1* | 8/2014 | Yang | H02H 7/222 |
| | | | 361/87 |
| 2015/0002977 A1* | 1/2015 | Dupraz | H01H 9/542 |
| | | | 361/115 |

FOREIGN PATENT DOCUMENTS

| CN | 103337851 A | 10/2013 |
| CN | 105024369 A | 11/2015 |

(Continued)

OTHER PUBLICATIONS

Search Report of Chinese Patent Application 2016109933291.
First Office Action of Chinese Patent Application 2016109933291.

*Primary Examiner* — Danny Nguyen
(74) *Attorney, Agent, or Firm* — Dragon Sun Law Firm, PC; Jinggao Li, Esq.

(57) ABSTRACT

The present disclosure provides an arc-free DC circuit breaker that combines magnetic induction transfer and resistive current limiting. The circuit breaker comprises a main current circuit and a transfer current circuit. The transfer current circuit has a bridge structure; with a group of unidirectional components having a breaking function, bidirectional current breaking is implemented, such that compared with the prior art, usage of the turn-off devices may be reduced to half. By controlling action sequences of the trigger gap, high-speed switch, and power semiconductor, fast switching arc-free opening of the main current circuit is implemented; meanwhile, the breaking capability of the circuit breaker is significantly improved. By virtue of the current limiting module circuit inside the transfer current circuit, the present disclosure quickly limits short-circuit fault current, and then reduces the number of parallel groups of full-controlled devices of the breaking module circuit. Compared with the existing circuit breaker structures, usage of turn-off devices and cost of the circuit breaker may be significantly reduced.

8 Claims, 8 Drawing Sheets

(51) Int. Cl.
  *H01H 33/59* (2006.01)
  *H02H 3/087* (2006.01)
  *H02H 7/26* (2006.01)
  *H01H 33/14* (2006.01)

(52) U.S. Cl.
  CPC .......... *H01H 33/596* (2013.01); *H02H 3/087* (2013.01); *H01H 33/14* (2013.01); *H02H 7/268* (2013.01)

(56) References Cited

FOREIGN PATENT DOCUMENTS

| CN | 105356435 A | 2/2017 |
|----|-------------|--------|
| CN | 206272216 U | 6/2017 |
| JP | 2005222705 A | 8/2005 |

* cited by examiner

ARC-FREE DC CIRCUIT BREAKER

FIELD OF THE INVENTION

The present disclosure relates to the field of high-voltage circuit breakers, and in particular relates to an arc-free DC circuit breaker that combines a magnetic induction transfer and resistive current-limiting.

BACKGROUND OF THE INVENTION

At present, breaking of a high voltage DC current can only satisfy the need of load current transformation in a point-to-point type DC transmission substation, but cannot break a short-circuit fault current at a system voltage yet; besides, breaking speed is also limited to a certain extent. Studies have shown that high-voltage DC short-circuit breaking based on methods of self-excited oscillation zero crossing, forced oscillation zero crossing and hybrid breaking have many pending difficulties to address, such that people are still unclear about the main theoretical fundaments that affect high-voltage DC breaking capacity and breaking speed. At the same time, since focus on the short-circuit current high-voltage DC breaking technologies is not enough, and relevant experimental data and experience accumulation is also insufficient; researchers in the industry have to rely on repeated tests for product development, which significantly delays the development progress, increases cost, and restricts product design optimization and performance enhancement. Therefore, it is an urgent task to launch relevant studies on high-voltage DC breaking technologies.

A typical hybrid circuit breaker utilizes a full-controlled power electronic device to realize rapid transfer and current breaking; however, the cost is expensive and a complex water cooling system is required, such that it is difficult to promote in future high voltage DC systems. In order to reduce usage of the full-controlled power electronic devices, an arc-free DC circuit breaker combining magnetic induction transfer and resistive current-limiting is provided. By using an induction module to quickly transfer current to capacitors and resistors, on the one hand, fast switching arc-free opening may be achieved and voltage withstanding capability of the break(er) is improved; on the other hand, current may be limited under a certain level through resistive current-limiting, and the current turn-off is achieved through an IGBT device. Usage of such circuit breaker IGBT devices can be significantly reduced to 25% of the conventional circuit breaker; besides, without the need of a complex cooling system, it has advantages such as a fast transfer speed, a strong voltage-withstanding capability, a high reliability and the like, and thus has a high feasibility.

SUMMARY OF THE INVENTION

In view of the drawbacks existing in the prior art, the present disclosure provides an arc-free DC circuit breaker, characterized in that the circuit breaker comprises a main current circuit and a transfer current circuit; wherein the main current circuit is for current in a normal working state to pass through;

the transfer current circuit is for when a short-circuit fault current occurs, implementing transfer of the short-circuit fault current from the main current circuit, and limiting and breaking the short-circuit fault current;

the transfer current circuit includes a bridge circuit, the bridge circuit comprising a first circuit (1), a second circuit (2); a third circuit (3), a fourth circuit (4), an induction module (5), an over-voltage protection module (6), a capacitor (C) and resistor (R);

the first circuit (1) and second circuit (2) are connected in series and then connected in parallel with a circuit formed by the third circuit (3) and the fourth circuit (4) which are connected in series;

a first endpoint is provided between the first circuit (1) and second circuit (2);

a second endpoint is provided between the third circuit (3) and the fourth circuit (4);

a serial-connection circuit formed by a secondary side inductor (L1) in the induction module (5), a circuit formed by the resistor (R) and the capacitor (C) connected in parallel, and the over-voltage protection module (6) are connected between the first endpoint and the second endpoint to form the bridge circuit.

Preferably, the main current circuit includes a high-speed mechanical switch (S) and a controllable device (A0) connected in series with the high-speed mechanical switch.

Preferably, the first circuit (1), the second circuit (2), the third circuit (3) and the fourth circuit (4) are any one of a vacuum trigger gap, a gas trigger gap or the high-speed mechanical switch, or a combination of them connected in series/parallel.

Preferably, the induction module (5) comprises:

a secondary side inductor (L1), a primary side inductor (L0), a first mutual inductance module (B1), and a second mutual inductance module (B2);

The secondary side inductor (L1) and the primary side inductor (L0) form a transformer; the primary side inductor (L0) is serially connected to the first mutual inductance module (B1) and the second mutual inductance module (B2) to form a closed loop; the first mutual inductance module (B1) comprises a pre-chargeable capacitor or a superconducting inductor, and the second mutual inductance module (B2) includes one or more of a half-controlled power semiconductor device, a gas trigger gap or a vacuum trigger gap.

Preferably, the secondary side inductor (L1) and the primary side inductor (L0) are hollow inductors or magnetic core-contained inductors.

Preferably, the over-voltage protection module (6) comprises a power semiconductor device (A6) and an arrestor (MOV) which are connected in parallel, wherein the power semiconductor device (A6) has a function of turning off the current; the arrester (MOV) is an arrestor formed by a varistor or a zinc oxide valve plate.

Preferably, the resistor (R) is selected from a group consisting of a carbon film resistor, a metal film resistor, a metal oxide film resistor, a wire-wound resistor, a high-power wire-wound resistor, an organic solid resistor, a fuse resistor, a cement resistor, a superconducting current-limiting resistor, a liquid metal resistor, and a PTC resistor.

Preferably, a fast switch (S) in the main current circuit, and the high-speed mechanical switch in the first circuit (1), the second circuit (2), the third circuit (3), the fourth circuit (4) are selected from the group consisting of an electromagnetic repulsion-based high-speed mechanical switch, a high-speed motor-driven mechanical switch or an explosion-driven high-speed mechanical switch.

The present disclosure has the following advantageous effects:

First, a transfer current circuit adopts a bridge type structure. By only one set of unidirectional breaking-enabled assemblies, a bidirectional breaking of the current may be implemented; compared with existing structures, usage of the turn-off device can be reduced by 50%.

Second, by controlling action sequences of the trigger gap, the high-speed switch and the power semiconductor, it is possible to implement fast switching arc-free opening of the main current circuit, thereby significantly improving the breaking capacity of the circuit breaker.

Third, the current limiting module circuit within the transfer current circuit may rapidly limit short circuit fault current, further reducing the number of parallel-connected groups of full-controlled devices of the breaking module circuit. Compared with the existing circuit breaker structure, usage of the turn-off device and cost of the circuit breaker can be significantly reduced.

BRIEF DESCRIPTION OF THE ACCOMPANYING DRAWINGS

Hereinafter, the preferred embodiments of the present disclosure will be described in further detail with reference to the embodiments.

Figure 5:
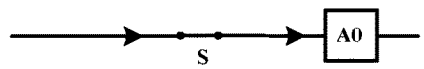
Figure 5:
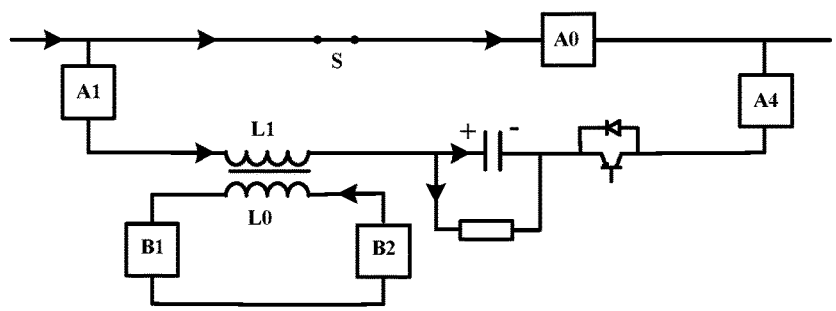
Figure 5:
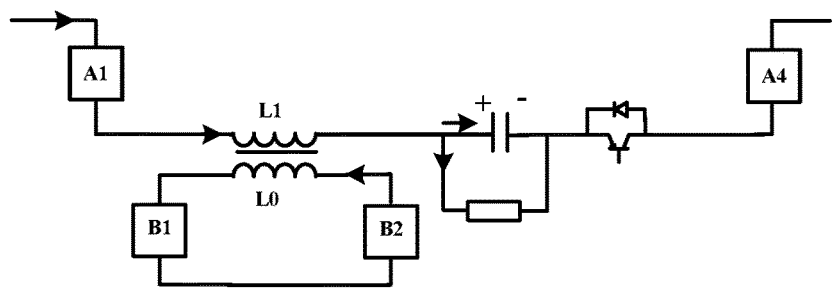
Figure 5:
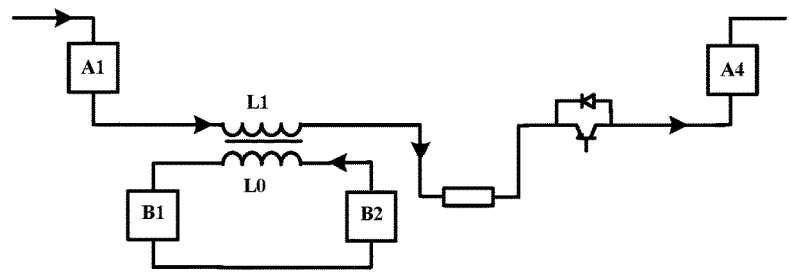
Figure 5:
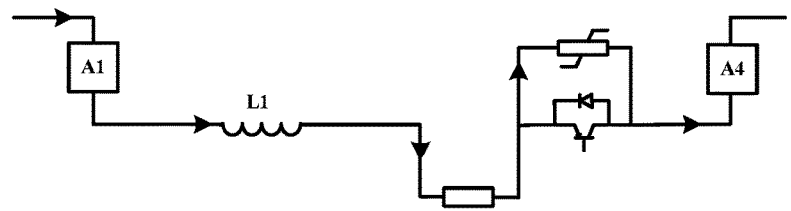
Figure 5:
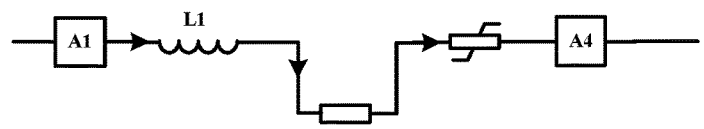
Figure 6:
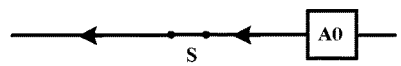
Figure 6:
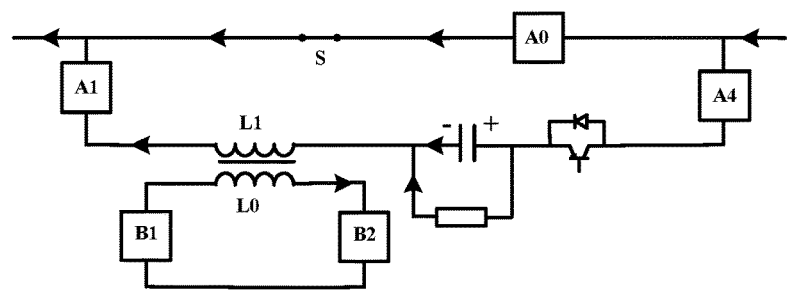
Figure 6:
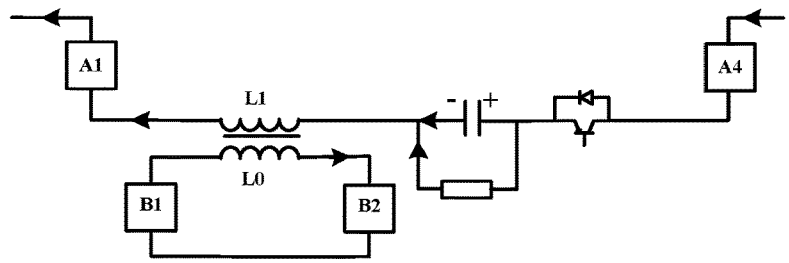
Figure 6:
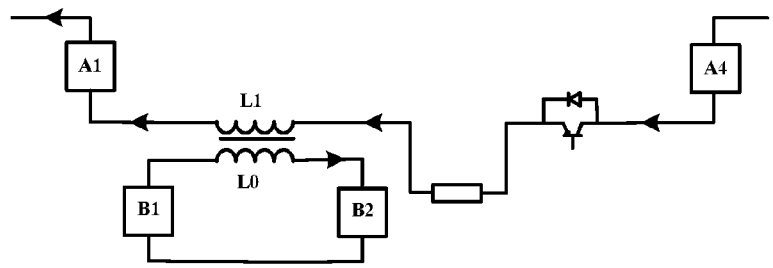
Figure 6:
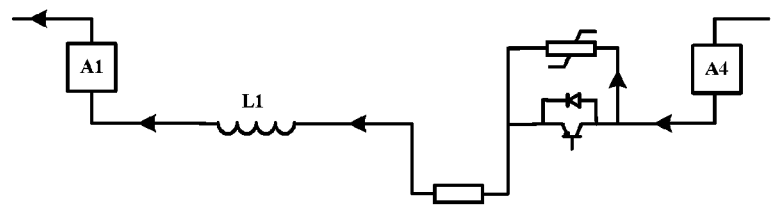
Figure 6:
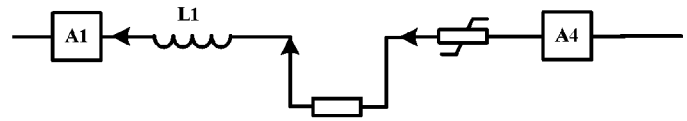
Figure 7:
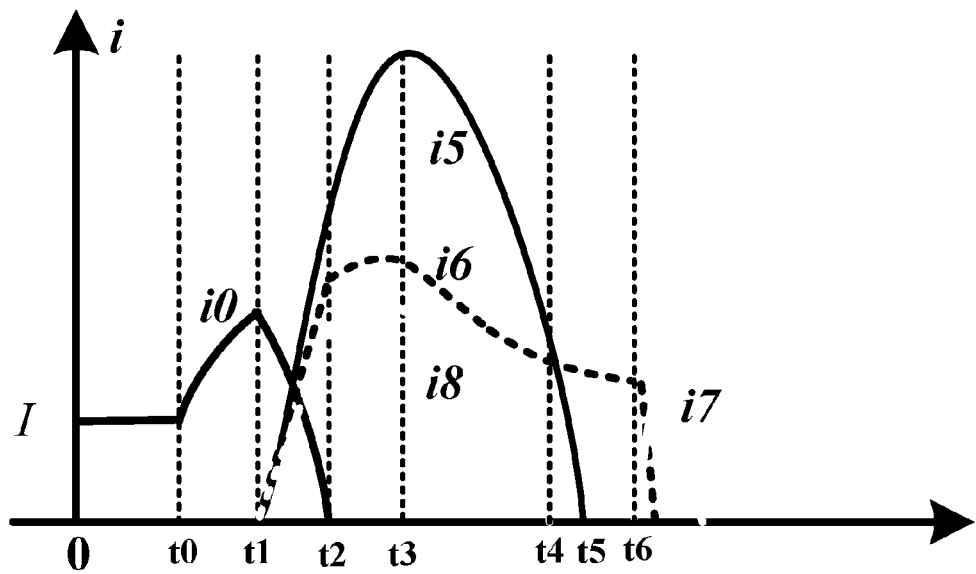
Figure 8:
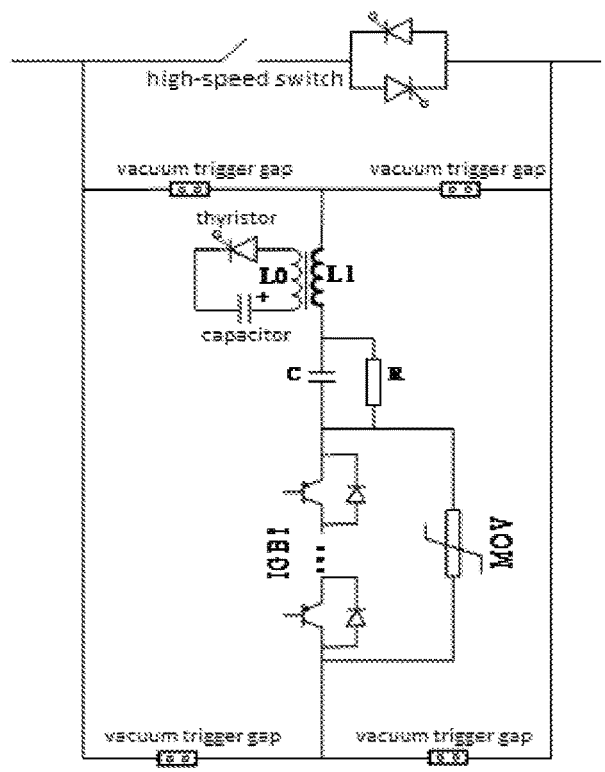
Figure 9:
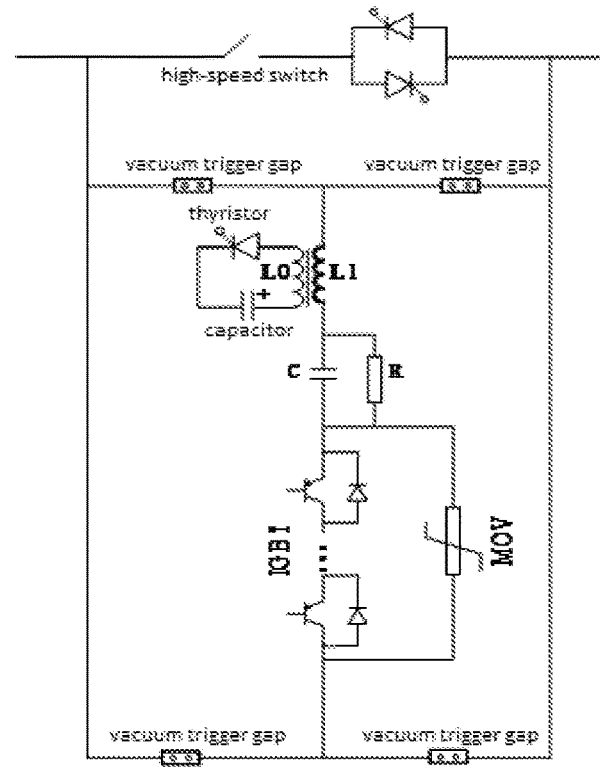
Figure 10:
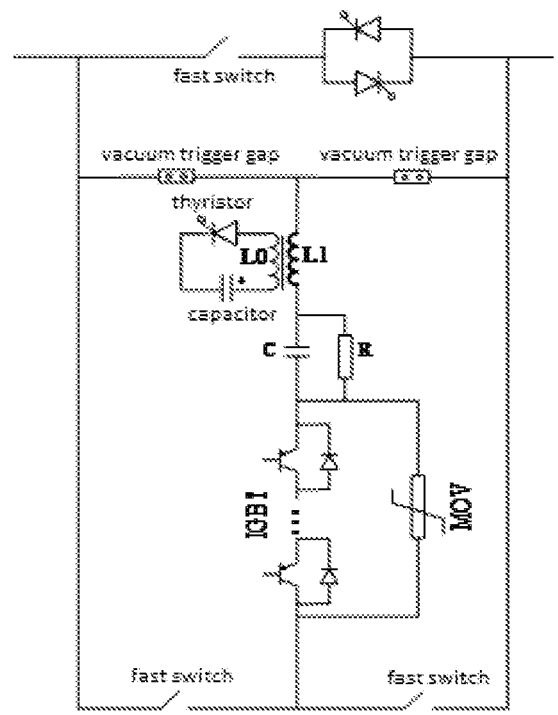

FIGS. 5(*a*)-5(*f*) provide current directions of respective branches in a transfer current circuit when breaking current;

FIGS. 6(*a*)-6(*f*) provide current directions of respective branches in a transfer current circuit when breaking current;

FIG. 7 is a curve graph of current change in respective circuits when a magnetic induction transfer current-limiting breaking-type DC circuit breaker is breaking current according to an embodiment of the present disclosure;

FIG. 8 is a diagram of a specific example of an embodiment of the present disclosure;

FIG. 9 is a diagram of another specific example of an embodiment of the present disclosure;

FIG. 10 is a diagram of a further specific example of an embodiment of the present disclosure.

DETAILED DESCRIPTION OF THE PREFERRED EMBODIMENTS

In order to make persons skilled in the art to better understand the solution of the present disclosure, technical solutions in embodiments of the present disclosure will be described clearly and comprehensively described in conjunction with the embodiment of FIGS. 1-10. It will be apparent that the embodiments as described are only part of the embodiments of the present disclosure, rather than all of the embodiments. Based on the embodiments in the present disclosure, all other embodiments obtained by a person skilled in the art without any creative efforts should fall within the scope of the invention.

The following detailed description is merely exemplary in nature and is not intended to limit application and uses. In addition, the present disclosure does not intend to be limited by the foregoing technical field, background, the brief summary or the following detailed description presented by any expressed or implied theory. Unless explicitly otherwise depicted, the word "comprise" and its variations should be understood to implicitly include the components but not exclude any other components.

Hereinafter, the preferred embodiments of the present disclosure will be described with reference to the accompanying drawings.

In one embodiment, the present disclosure discloses an arc-free DC circuit breaker combining magnetic induction transfer and a resistive current-limiting, the circuit breaker comprising a main current circuit and a transfer current circuit;

the main current circuit being for current in a normal working state to pass through;

the transfer current circuit being for when a short-circuit fault current occurs, implementing transfer of the short-circuit fault current from the main current circuit, and limiting and breaking the short-circuit fault current.

Figure 1:
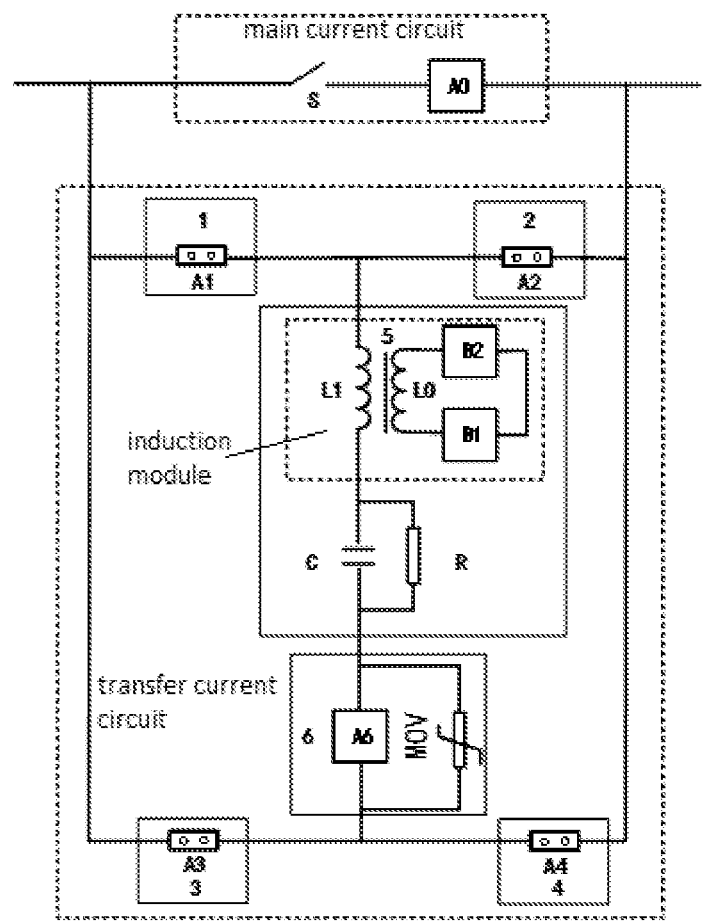
FIG. 1 is a schematic structural diagram of a circuit breaker body in an embodiment.
Figure 2:
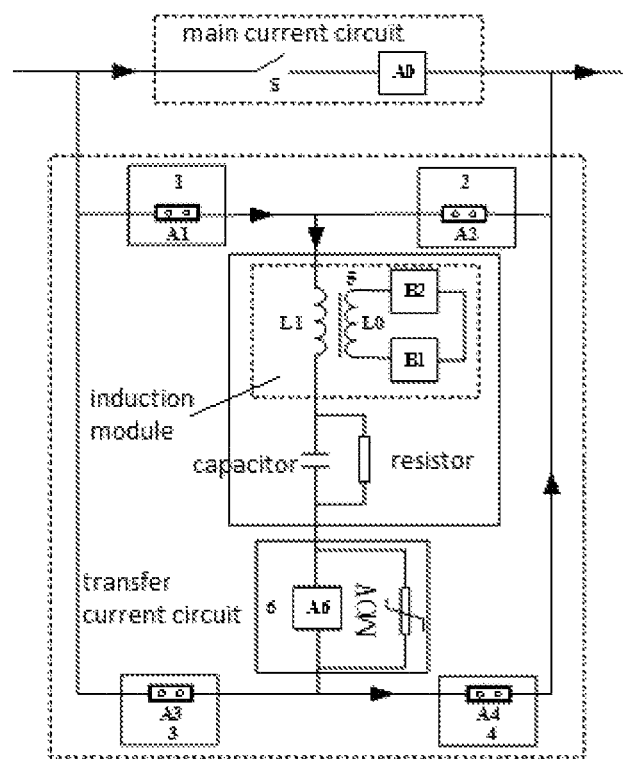
FIG. 2 is a schematic structural diagram when a circuit breaker works unidirectionally in an embodiment of the present disclosure.
Figure 3:
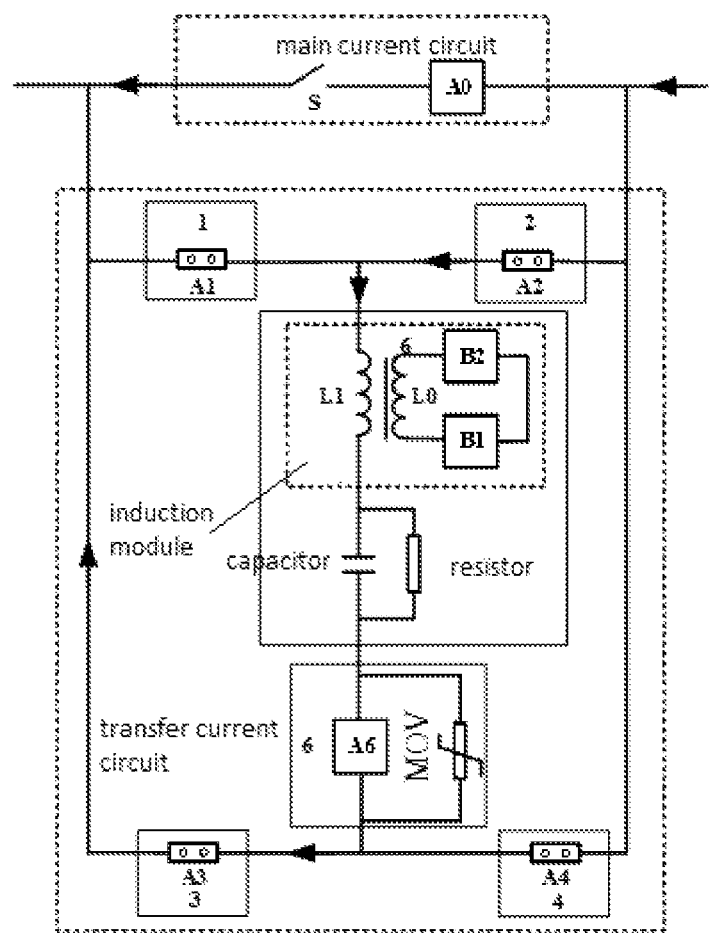
FIG. 3 is another schematic structural diagram when a circuit breaker works unidirectionally in an embodiment of the present disclosure.

In the present embodiment, a schematic structural diagram of a circuit breaker body as shown in FIG. 1 comprises a main current circuit, a transfer current circuit, and an over-voltage limiting circuit. In order to better illustrate a breaking process of the circuit breaker, FIG. 2 shows a structural diagram of a circuit breaker current from left to right, which embodies that a hybrid circuit breaker contained in the present embodiment has a bidirectional function; FIG. 3 is a schematic structural diagram of current from right to light. The circuit breaker can accept system current from different directions, i.e., a bidirectional circuit breaker. It is easily understood that in the art, the circuit breaker may also comprise a control system or a controller to control on and off of relevant components in the circuit breaker.

In one embodiment, the main current circuit comprises a high-speed mechanical switch S and mutually anti-parallel thyristors.

In one embodiment, the transfer current circuit comprises circuit 1 to circuit 6;

The circuit 1 is serially connected to the circuit 2, the circuit 3 is serially connected to the circuit 4, the circuit 5 is serially connected to the circuit 6; the circuit 5 and the circuit 6 are connected at an endpoint between the circuit 1 and the circuit 2 and an end point between the circuit 3 and the circuit 4, respectively.

In the present embodiment, the circuit 1 and the circuit 2 are connected in series to form a 1-to-2 transfer circuit branch, the 1-to-2 branch being parallel connected to the main current circuit; the circuit 3 and the circuit 4 are connected in series to form a 3-to-4 transfer circuit branch, the 3-to-4 branch being parallel connected to the main current circuit.

In one embodiment, the circuits 1 to 4 may be a vacuum trigger gap, a gas trigger gap or the high-speed mechanical switch, or a combination;

the circuit 5 comprises B1 consisting of a primary side inductor L0, a secondary side inductor L1, and a pre-charging capacitor or a superconducting inductor, B2 consisting of a power semiconductor device or a trigger gap, a capacitor C and a resistor R; the primary side inductor L0 and the secondary side inductor L1 form a transformer; L0 and L1 may each include a plurality of inductors connected in series and parallel, the L0, B1 and B2 are connected in series, and the capacitor and the resistor are connected in parallel and then connected in series with the induction module.

comprises a power semiconductor device (A6) and an arrestor (MOV) which are connected in parallel, wherein the power semiconductor device (A6) has a function of turning off the current.

An endpoint is provided between the circuit 1 and the circuit 2, and an endpoint is provided between the circuit 3 and the circuit 4; the circuit 5 and the circuit 6 are connected between the two endpoints.

In one embodiment, the primary side inductor and the secondary side inductor which form a transformer are hollow inductors or magnetic core-contained inductors.

In one embodiment, the resistor is selected from a group consisting of a carbon film resistor, a metal film resistor, a metal oxide film resistor, a wire-wound resistor, a high-power wire-wound resistor, an organic solid resistor, a fuse resistor, a cement resistor, a superconducting current-limiting resistor, a liquid metal resistor, and a PTC resistor.

In one embodiment, a fast switch (S) in the main current circuit or a fast switch in circuits 1-4 are selected from the group consisting of an electromagnetic repulsion-based high-speed mechanical switch, a high-speed motor-driven mechanical switch or an explosion-driven high-speed mechanical switch.

In the present embodiment, a circuit breaker according to claim 1 is characterized in that: the device B2 is formed by one or more of a half-controlled power semiconductor device, a gas trigger gap or a vacuum trigger gap connected in series or in parallel, wherein the power semiconductor device includes, but not limited to, a thyristor, an IGBT, an IGCT, a GTO, and etc.

The power semiconductor device in the circuit 6 is a full-controlled power semiconductor device, including, but not limited to, one of IGBT, IGCT, and GTO, or any combination thereof.

In one embodiment, when the circuit breaker is in a normal working state, current flows through the main current circuit; at this point, no current flows through the transfer current circuit and the over-voltage limiting circuit.

Figure 4:
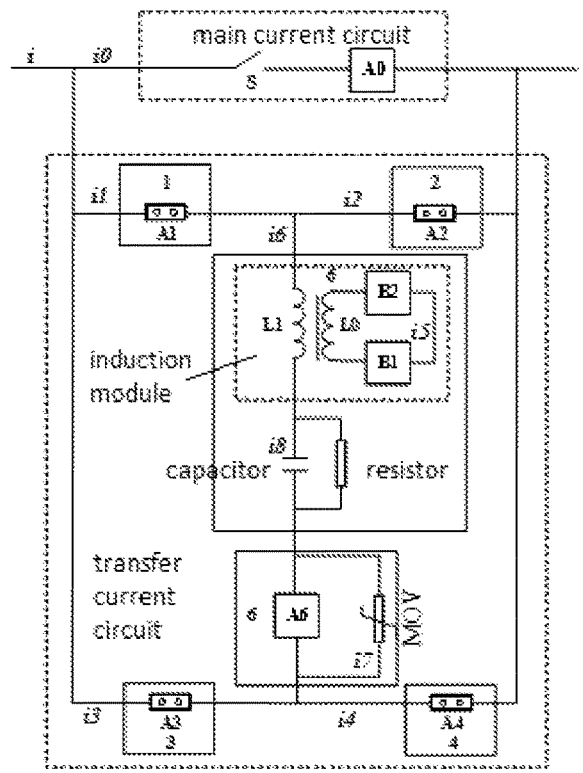
FIG. 4 is a schematic diagram of current marks of a transfer current circuit when breaking current in an embodiment of the present disclosure.

In one embodiment, when a short-circuit fault occurs and it is needed to break the short-circuit current:

If it is detected that the direction of the short-circuit current is from left to right, the circuit 1 and the circuit 4 are controlled to be conducted; the circuit 2 and the circuit 3 are still in a turned-off state; the power semiconductor device in the circuit 6 is connected to the circuit according to the conduction direction, and the current is transferred from the main current circuit to a 1-5-6-4 branch formed by the circuits 1, 5, 6, and 4;

If it is detected that the direction of the short-circuit current is from right to left, the circuit 2 and the circuit 3 are controlled to be conducted; the circuit 1 and the circuit 4 are still in a turned-off state; the power semiconductor device in the circuit 6 is accessed to the circuit according to the conduction direction, and the current is transferred from the main current circuit to a 2-5-6-3 branch formed by circuits 2, 5, 6 and 3;

In the present embodiment, FIG. 4 shows current marks of respective branches of the transfer current circuit when breaking current, wherein i denotes a current flowing through a circuit breaker, i0 denotes current flowing through the main current circuit, i1 denotes current flowing through the circuit 1, i2 denotes current flowing through the circuit 2, i3 denotes current flowing through the circuit 3, i4 denotes current flowing through the circuit 4, i5 denotes current flowing through B1, B2 and L0 in the circuit 5, i6 denotes current flowing through L1 and the circuit 6 in the circuit 5, and i7 denotes current flowing through MOV in the circuit 6.

With current from left to right as an example, FIGS. 5(*a*)-5(*f*) and FIGS. 6(*a*)-6(*f*) provide current directions of respective branches in the transfer current circuit when breaking current; FIG. 5(*b*) shows current direction of transferring current to a trigger gap or a high-speed switch A1, a circuit A6, an inductor L1, and a transfer branch consisting of the trigger gap or a high-speed switch A4 when breaking current in an embodiment; FIG. 5(C) shows current direction of completely transferring current to a trigger gap or a high-speed switch A1, a circuit A6, an inductor L1, and a transfer branch consisting of the trigger gap or a high-speed switch A4 when breaking current in an embodiment. Specifically, they are current directions of respective branches at respective times from t0 to t5. FIG. 7 shows is a curve graph of current change in respective circuits when a magnetic induction transfer current-limiting breaking-type DC circuit breaker is breaking current according to embodiments in FIGS. 5(*a*)-5(*f*).

The working procedure of the circuit breaker of the present disclosure will be described by examples, including the following aspects (with current direction from left to right as an example):

1) when the system works normally and all of the current flows through the main current circuit, as shown in FIG. 5(*a*), wherein the system rational current is I, the capacitor or the superconducting inductor B1 is pre-charged. The circuits 1, 2, 6 are all in a turned-off state, and the high-speed switches S1 and S2 are closed;

2) detecting whether a short-circuit fault occurs to the system:

Suppose at time t0, the system has a short-circuit fault, and the main current circuit starts rising; between t0 and t1, in the case of exceeding a system short-circuit threshold, occurrence of the short-circuit fault is detected;

3) further processing of the detected short-circuit fault:

At time t1, device B2 is conducted, and meanwhile, devices A1, A4 and the power semiconductor device A6 are conducted; at this point: B1, B2 and L0 form a discharging circuit, and meanwhile current is sensed in the inductor L1; current of the main current loop is gradually transferred to the transfer current branch 1-5-6-4, and the current of the main current circuit decreases, as shown in FIG. (b);

At time t2, current of the fast switch is all transferred; afterwards, the fast switch is controlled to be arc-free opened: when the opening starts, due to existence of the mechanical delay, a break has not been formed yet;

At time t3, a break is formed, as illustrated in FIG. 5(C);

At time t4, all current in the capacitor of the transfer branch is transferred to the resistor, as shown in FIG. 5(*d*);

At time t5, the primary side current in the induction module is reduced to 0;

At time t6, the power semiconductor device in the circuit 6 is turned off, and the arrestor is conducted, as shown in FIG. 5(2), wherein the current starts being transferred to the arrestor;

At time t7, all current in the branch 1-5-6-4 is transferred to the arrester in the circuit 6, as shown in FIG. 5(*f*); at this point, the voltage at two ends of the circuit breaker reaches the highest value, which is the over-voltage peak at both ends of the circuit breaker during the breaking procedure; afterwards, current in the arrestor starts falling, and the voltage at two ends of the circuit breaker also starts falling gradually; when the system current is slower than the minimum conduction current 1 mA of the arrestor, the arrestor is turned-off, and the voltage at both ends of the arrestor drops rapidly;

At time t8, the current in the arrestor is 0, and breaking of the circuit breaker is completed, and the voltage at both ends of the circuit breaker is the system voltage.

Similarly, with the current direction from right to left, FIG. 6(A) shows current direction in normal operation of the system when breaking current; FIG. 6(B) shows current direction of transferring current to a trigger gap or a high-speed switch A2, an inductor L1, a circuit A6, and a transfer branch consisting of the trigger gap or a high-speed switch A4 when breaking current in an embodiment; and FIG. 6(C) shows current direction of completely transferring current to a trigger gap or a high-speed switch A2, an inductor L1, a circuit A6, and a transfer branch consisting of the trigger gap or a high-speed switch A3 when breaking current in an embodiment.

1) When the system operates normally and all content flows through the main current circuit, as shown in FIG. 6(a), wherein the system rational current is I, the capacitor or the superconducting inductor B1 is pre-charged. Circuits 1, 2 and 6 are all in a turned-off state, and high-switches S1, S2 are closed;

2) detect whether the system has a short-circuit fault:

suppose at time t0, the system has a short-circuit fault, and current of the main current circuit starts rising; between t0 and t1, when the current exceeds the system threshold, occurrence of the short-circuit fault is detected.

3) at time t1, conduct device B2, and meanwhile conduct devices A2, A3 and the power semiconductor device A6; at this point: B1, B2 and L0 form a discharging circuit, and meanwhile current is inducted in the inductor L1; current of the main current loop is gradually transferred to the transfer current branch 2-5-6-3, and the current of the main current circuit decreases, as shown in FIG. 6(b);

at time t2, all of the current of the fast switch is transferred; afterwards, the fast switch is controlled for arc-free opening; when the opening starts, due to existence of the mechanical delay, the break is not formed yet;

at time t3, the break is formed, as shown in FIG. 6(c);

at time t4, all current in the transfer branch capacitor is transferred to the resistor, as shown in FIG. 6(d);

at time t5, the primary side current of the induction module drops to 0;

at time t6, the power semiconductor device in circuit 6 is turned off, and the arrestor is conducted, as shown in FIG. 6(e); and the current starts being transferred to the arrestor;

at time t7, all current in the branch 2-5-6-3 is transferred to the arrestor in circuit 6, as shown in FIG. 6(f); at this point, the voltage at both ends of the circuit breaker reaches the highest value, i.e., an overvoltage peak value at two ends of the circuit breaker during the opening process; afterwards, the current in the arrestor starts falling, and the voltage at both ends of the circuit breaker also starts falling slowly; when the system current is lower than the minimum conduction current 1 mA of the arrestor, the arrestor is turned-off, and the voltage at both ends of the arrestor drops rapidly;

at time t8, the current in the arrestor is 0, and breaking of the circuit breaker is completed; the voltage at both ends of the circuit breaker drops to the system voltage.

In one embodiment, the fast switch S in the main current circuit or the fast switch in circuits 1-4 are selected from the group consisting of an electromagnetic repulsion-based high-speed mechanical switch, a high-speed motor-driven mechanical switch or an explosion-driven high-speed mechanical switch.

In one embodiment, the circuit 1 to circuit 4 may be a vacuum trigger gap, a gas trigger gap or the high-speed mechanical switch, or a combination thereof connected in series parallel;

The power semiconductor device having a current turn-off capability in the circuit 6 includes, but not limited to, one of IGBT, IGCT, and GTO, or any combination thereof;

The secondary side inductor L1 and the primary side inductor L0 that form a transformer are hollow inductors or magnetic core-contained inductors.

The B2 is formed by one or more of a half-controlled power semiconductor device, a gas trigger gap or a vacuum trigger gap which are connected in series parallel, wherein the power semiconductor device includes, but not limited to, a thyristor, IGBT, IGCT, GTO, etc.

In one embodiment, the arrestor is an arrestor consisting of a varistor or a zinc oxide valve plate.

In one embodiment, FIG. 10 shows a diagram of a specific example. In the main current circuit, A0 comprises two groups of thyristors in anti-parallel connection. A1, A2, A3, A4 are vacuum trigger gaps. A6 consists of a plurality of IGBT in series parallel. B1 is a pre-charging capacitor; B2 is a thyristor.

In one embodiment, FIG. 8 shows a diagram of a specific example. A1, A2, A3 and A4 are vacuum trigger gaps; A6 consists of IGBTs in series parallel. B1 is a pre-charging capacitor, and B2 is a thyristor.

In one embodiment, FIG. 9 shows a diagram of a specific example. In the example, A1, A2, A3, and A4 are air trigger gaps. A6 consists of IGBTs in series parallel. B1 is a superconducting inductance, and B2 is a power diode.

According to the present disclosure, B2 is a unidirectionally conducted power semiconductor or a combination thereof. The power semiconductor device of the circuit 6 is a power semiconductor device having a capability of turning off current.

The present disclosure discloses an arc-free DC circuit breaker combining magnetic induction transfer and resistive current-limiting, comprising a main current circuit, a transfer current circuit and an overvoltage limiting circuit. The transfer current circuit comprises a bridge structure, the bridge structure including a vacuum trigger gap, a gas trigger gap, or a high-speed switch, such that with only one set of unidirectional full-controlled power semiconductor devices, bidirectional current can be broken. When the circuit breaker needs to break current, by controlling action sequences of the trigger gap, the high-speed switch and the power semiconductor, break arc-free opening of the high-speed switch of the main current circuit can be realized, and the voltage withstanding capability can be enhanced. The transfer current circuit uses a bridge structure, such that with only one set of components having a breaking function, bidirectional current breaking can be achieved; compared with the prior art structure, the usage amount of the turn-off devices can be reduced by 50%. Meanwhile, the transfer circuit comprises therein a current limiting module circuit 5 and a breaking module circuit 6; by transferring the current in the main circuit to the current limiting module, usage of the turn-off devices in the breaking module may be further reduced; therefore, the total usage of turn-off devices becomes 25% of the original, which significantly reduces the cost of the circuit breaker.

The content above is further detailed depiction of the present disclosure in conjunction with specific preferred embodiments. It should not be regarded that the preferred embodiments of the present disclosure are limited thereto; to those skilled in the art, several simple deductions or substitutions may also be made without departing from the idea of the present disclosure, which should be regarded as falling within the protection scope determined by the submitted claims.

The invention claimed is:

1. An arc-free DC circuit breaker, characterized in that the circuit breaker comprises a main current circuit and a transfer current circuit; wherein
the main current circuit is for current in a normal working state to pass through;
the transfer current circuit is for when a short-circuit fault current occurs, implementing transfer of the short-circuit fault current to the main current circuit, and limiting and breaking the short-circuit fault current;
the transfer current circuit includes a bridge circuit, the bridge circuit comprising a first circuit (1), a second circuit (2); a third circuit (3), a fourth circuit (4), an induction module (5), an over-voltage protection module (6), a capacitor (C) and resistor (R);
the first circuit (1) and second circuit (2) are connected in series and then connected in parallel with a circuit formed by the third circuit (3) and the fourth circuit (4) which are connected in series;
a first endpoint is provided between the first circuit (1) and second circuit (2);
a second endpoint is provided between the third circuit (3) and the fourth circuit (4);
a serial-connection circuit formed by a secondary side inductor (L1) in the induction module (5), a circuit formed by the resistor (R) and the capacitor (C) connected in parallel, and the over-voltage protection module (6) is connected between the first endpoint and the second endpoint to form the bridge circuit.

2. The DC circuit breaker according to claim 1, characterized in that the main current circuit includes a high-speed mechanical switch (S) and a controllable device (A0) connected in series with the high-speed mechanical switch.

3. The DC circuit breaker according to claim 1, characterized in that the first circuit (1), the second circuit (2), the third circuit (3) and the fourth circuit (4) are any one of a vacuum trigger gap, a gas trigger gap or the high-speed mechanical switch, or a combination of them connected in series/parallel.

4. The DC circuit breaker according to claim 1, characterized in that the induction module (5) comprises:
a secondary side inductor (L1), a primary side inductor (L0), a first mutual inductance module (B1), and a second mutual inductance module (B2);
the secondary side inductor (L1) and the primary side inductor (L0) form a transformer; the primary side inductor (L0) is serially connected to the first mutual inductance module (B1) and the second mutual inductance module (B2) to form a closed loop; the first mutual inductance module (B1) comprises a pre-chargeable capacitor or a superconducting inductor, and the second mutual inductance module (B2) includes one or more of a half-controlled power semiconductor device, a gas trigger gap or a vacuum trigger gap.

5. The DC circuit breaker according to claim 4, characterized in that the secondary side inductor (L1) and the primary side inductor (L0) are hollow inductors or magnetic core-contained inductors.

6. The DC circuit breaker according to claim 1, characterized in that the over-voltage protection module (6) comprises a power semiconductor device (A6) and an arrestor (MOV) which are connected in parallel, wherein the power semiconductor device (A6) has a function of turning off the current; the arrester (MOV) is an arrestor formed by a varistor or a zinc oxide valve plate.

7. The DC circuit breaker according to claim 1, characterized in that the resistor (R) is selected from a group consisting of a carbon film resistor, a metal film resistor, a metal oxide film resistor, a wire-wound resistor, a high-power wire-wound resistor, an organic solid resistor, a fuse resistor, a cement resistor, a superconducting current-limiting resistor, a liquid metal resistor, and a PTC resistor.

8. The DC circuit breaker according to claim 3, characterized in that a fast switch (S) in the main current circuit, and the high-speed mechanical switch in the first circuit (1), the second circuit (2), the third circuit (3), the fourth circuit (4) are selected from the group consisting of an electromagnetic repulsion-based high-speed mechanical switch, a high-speed motor-driven mechanical switch or an explosion-driven high-speed mechanical switch.

* * * * *